(12) United States Patent
Kavosh et al.

(10) Patent No.: US 6,797,130 B2
(45) Date of Patent: Sep. 28, 2004

(54) LASER TEXTURED MAGNETIC DISK

(75) Inventors: Iraj Kavosh, San Jose, CA (US);
James Shuster, Gilroy, CA (US);
Andrew Ching Tam, Saragota, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/607,937

(22) Filed: Jun. 27, 2003

(65) Prior Publication Data

US 2004/0091662 A1 May 13, 2004

Related U.S. Application Data

(62) Division of application No. 09/947,287, filed on Sep. 5, 2001, now abandoned.

(51) Int. Cl.[7] .......................... B23K 26/06; B29C 35/08; B05D 5/12; G11B 5/66
(52) U.S. Cl. ............... 204/192.2; 264/497; 219/121.75; 427/130; 428/694 TC
(58) Field of Search .......................... 204/192.2, 192.3, 204/192.34, 192.35; 427/127, 130, 131; 264/400, 497; 219/121.15, 121.6, 121.73, 121.75; 428/65.5, 65.3, 634, 408, 694 TC, 694 T; 360/135

(56) References Cited

U.S. PATENT DOCUMENTS

| | | | | |
|---|---|---|---|---|
| 5,958,542 A | * | 9/1999 | Ootake et al. | 428/694 TC |
| 5,980,997 A | * | 11/1999 | Ross et al. | 427/130 |
| 6,013,336 A | * | 1/2000 | Baumgart et al. | 427/130 |
| 6,096,445 A | * | 8/2000 | Terakado et al. | 428/694 T |
| 6,107,599 A | * | 8/2000 | Baumgart et al. | 219/121.77 |
| 6,168,744 B1 | * | 1/2001 | Malshe et al. | 264/400 |
| 6,299,947 B1 | * | 10/2001 | Suzuki et al. | 427/131 |
| 6,483,666 B2 | * | 11/2002 | Wei et al. | 360/135 |
| 6,558,771 B1 | * | 5/2003 | Tang et al. | 428/694 TC |

OTHER PUBLICATIONS

Definition of "Near Infrared" McGraw–Hill Dictionary of Science and Technology Online, 2004 McGraw–Hill Companies.*

* cited by examiner

Primary Examiner—Louis Falasco
(74) Attorney, Agent, or Firm—Lewis L. Nunnelley

(57) ABSTRACT

A magnetic disk is provided which comprises a nonmetallic glass or glass ceramic substrate having one or more under layers, a magnetic layer applied over the under layers, and a hard carbon layer applied over the magnetic layer. A plurality of bumps are formed on the magnetic disk by applying a beam from a near infrared wavelength laser to the surface of the carbon layer.

7 Claims, 10 Drawing Sheets

Full Area Size: 163μm x 123μm

LASER TEXTURED MAGNETIC DISK

This is a divisional of application Ser. No. 09/947,287, filed Sep. 5, 2001, now abandoned

FIELD OF THE INVENTION

The present invention pertains to the texturing of magnetic disks. More particularly this invention pertains to using a near infrared wavelength laser to create bumps on a nonmetallic substrate based magnetic disk.

BACKGROUND OF THE INVENTION

A direct access storage device uses magnetic disks to store electronic data. The disks are rotated on a central axis in combination with magnetic heads for reading and writing magnetic signals.

A "contact start/stop" (CSS) system uses a magnetic head which is in contact with the magnetic disk surface only when the disk is stationary. When the disk starts to rotate the magnetic head slides off the surface eventually flying fully lifted from the disk surface.

A smooth recording surface is preferred to permit the magnetic head to ride as close as possible to the disk surface. In order to avoid stiction, which occurs during the start process in a CSS system, a textured region of the rotating disk surface is used for the contact area with the magnetic head. The surface texture in a contact start/stop region reduces the contact stiction and friction. The magnetic head is moved to the contact region at the appropriate times by the drive controller.

It is known in the art to use a laser to create bumps on the surface of the disk to produce a textured region as a contact area in a CSS disk drive system. Laser zone texturing (LZT) processes are widely used in the hard disk drive industry to allow precise control of the roughness of the hard disk contact area. In laser zone texturing, an annular area typically 2–3 mm wide of the disk surface is roughened by a laser. The laser produces micro-sized bumps to provide a take off and landing zone for the flying head during the contact start/stop operation. Usually, the laser texturing process is applied to a nonmagnetic substrate prior to conventionally employed processes for producing the magnetic recording disks.

Traditionally, a magnetic disk is manufactured by initially starting with an aluminum magnesium (AlMg) substrate which is then plated with nickel phosphorus (NiP). The texturing is then performed on the plated NiP layer. On top of the NiP plated AlMg substrate, a magnetic layer is sputter deposited.

In particular, because of their performance characteristics, it is desirable to use a tightly focused laser beam, with TEM00 spatial mode and Gaussian intensity distribution profile, from diode pumped neodymium-doped yttrium-lithium-fluoride (Nd:YLF) or a neodymium-doped yttrium-vanadate (Nd:YVO4) solid state laser to create the bumps on a disk surface. The Nd:YVO4 laser is also referred to as an Nd:Vanadate laser or a Vanadate laser. These lasers are in the near infrared (near-IR) family of lasers. The near-IR wavelength lasers provide sufficient absorption and coupling of laser energy into the smooth amorphous NiP material that had been deposited onto the AlMg substrate.

An example of a laser texturing tool is provided in commonly owned U.S. Pat. No. 6,013,336, Baumgart et al, "Procedure Employing a Diode Pumped Laser for Controllably Texturing a Disk Surface". Other laser texturing tools are well known to those skilled in the art.

In the last few years the use of alternative nonmetallic substrates such as glass or glass-ceramic substrates has become widely accepted in the industry due to the superior mechanical advantages of glass and glass-ceramic material. A glass based substrate provides a smoother surface for the magnetic layer. The smoother the recording surface, the closer the proximity of the head to the disk. This allows more consistent and predictable behavior of the air bearing support for the head which enables a higher recording density.

However, since glass materials are optically transparent in the near IR wavelength range, the vanadate laser based texturing tools cannot be used for the laser zone texturing process on the raw glass substrate.

As an alternative laser texturing process, a $CO_2$ laser based system is known in the industry to be used for zone texturing raw glass substrates. This is because the glass substrate material is sufficiently absorbent at wavelengths produced by $CO_2$ lasers. The textured glass substrate can then be processed to the finished magnetic disk by depositing at least one underlayer, then a magnetic layer and then a protective overcoat (commonly a carbon or carbon-based layer). Examples of a laser texturing tool for glass substrates is found in commonly owned U.S. Pat. No. 6,107,599, Baumgart et al, "Method and Tool for Laser Texturing of Glass Substrates".

However, the bump formation mechanism as well as the bump shape for the above processes are different. Bump formation on a NiP-plated AlMg disks is governed by rapid melting and resolidification process of the heated spot on the substrate surface, and the final bump shape depends on thermocapillary and chemicapillary effects created by the laser pulse. While the bump formation on a glass disks (using $CO_2$ laser) is due to laser absorption in the glass and the consequent thermal expansion of the heated area.

While the $CO_2$ laser can be used to texture raw glass substrates, there are limitations in the ability of $CO_2$ laser texturing tools to optimally texture disks. Therefore, it is desirable to provide a method for texturing the glass based substrate disks using the Nd:Vanadate laser because Nd:Vanadate lasers provides greater flexibility in the process of producing a textured zone.

Furthermore, the Nd:Vanadate laser texturing systems are currently widely used in the manufacturing texturing process of NiP-plated AlMg substrates. It is more economical to be able to use the more readily available laser systems for the glass substrate disks.

An approach to providing zone texturing of a glass substrate has been demonstrated in U.S. Pat. No. 5,980,997. In this approach, a smooth metallic layer is first deposited on a glass substrate, and the metallic layer is then textured by a laser beam. The metallic layer is preferably impact resistant, hard and has a high-melting temperature greater than 1000 degrees centigrade. Since such a deposited metallic layer (i.e., texture layer) absorbs laser energy at near-IR wavelengths, a Vanadate laser based texturing tool can be used to produce a textured zone on the glass substrate deposited with a texture layer. The textured glass substrate then undergoes the conventional processes for the manufacturing of a magnetic disk. A disadvantage of this approach is that an extra step is added to the manufacturing process of depositing a texture layer before the laser texturing process is completed. Such a step obviously adds to the manufacturing costs of a magnetic disk production. Therefore, there is a need for a laser texturing process for glass-substrate magnetic disks which does not add to any of the production costs and allows for greater flexibility in the use of the Vanadate-laser-based texturing tool.

It is also desirable to provide a process for marking a disk, including alphanumeric writing, on a sputtered or finished disk. Disk marking can be used to distinguish a good and a defective side of a single sided finished disk by producing a textured ring or other arbitrary pattern on the defective side of the finished glass disk. Such a marked finished glass disk can be used in a load/unload drive and not necessarily in a contact start/stop drive. Implementation of such marking process in manufacturing can extend applicability of the existing texturing systems to disk marking processes.

The marking of a disk can also be useful for identifying a disk. When a disk is in use, installed in a computer system, it is helpful to be able to determine when and where the disk was manufactured. Marking a disk with this information enhances quality assurance processes.

It is also desirable to use textured glass substrate disks to determine the glide height of a magnetic head over a magnetic disk. It is currently known in the industry to use textured disks to test whether a magnetic head flying over a disk touches the disk surface which causes problems.

During reading and recording operations, the head is positioned as close to the disk surface as possible. There are topological asperities, typically, only a few microns (or smaller) in diameter and height range from about a few micro-inches to sub-micro inches, formed on the surface of a disk which make it necessary to limit the proximity of the head to the disk surface. Conventional disk drives are manufactured with precise specifications including maximum glide height for a magnetic head above the data zone. In recognition of the inevitable topographical asperities, conventional practice comprises testing each magnetic disk to determine if the maximum glide height requirement is met. Such testing typically comprises the use of a device known as a glide tester.

Conventional glide testers typically use a reference disk containing a single (or multiple) protusions formed by photolythographic techniques, or single (or multiple) laser-textured bump(s) on AlMg substrates, or raw glass substrates, having a defined height. The referenced disk is rotated and a magnetic head is lowered until the magnetic head contacts the bump at which point an electrical signal is generated indicating the glide height. Of particular significance is the need for the bumps on the reference disk to accurately simulate asperities inevitably present on the surface of a magnetic disk. There exists a need for an efficient and cost-effective method to produce such a reference disk.

There is also a need to better control the shape and orientation of laser produced bumps to provide a more controllable contact start/stop zone wherein stiction is reduced without compromising durability. It is also desirable to control and adjust the bump shape for a glide tester reference disk to optimize electrical signal generation during the process of glide height calibration, and to overcome signal generation issues associated with $CO_2$ laser produced bumps on raw glass substrates. More particularly, it is desirable to efficiently produce bumps with elongated shapes to achieve these goals.

One or more of the foregoing problems are solved and one or more of the foregoing needs are met by the present invention.

SUMMARY OF THE INVENTION

A magnetic disk is provided which comprises a glass or glass/ceramic substrate, one or more under layers, a magnetic layer applied over the substrate, and a carbon layer applied over the magnetic layer. A plurality of bumps are formed on the magnetic disk by applying a laser beam to the surface of the carbon layer.

In a further embodiment of the present invention a method is provided for preparing a magnetic disk comprising first applying one or more under layer(s) and a magnetic layer to a glass or glass ceramic substrate. A carbon overcoat layer is then applied over the magnetic layer. A plurality of bumps is incorporated onto the surface of the disk by applying a laser to the surface of the carbon layer. In a further embodiment a lubricant is applied over the carbon overcoat layer.

In a further embodiment of the present invention the bump formation process can be conducted after applying the lubricant layer on the magnetically sputtered disk.

In a further embodiment, a plurality of bumps formed in a concentric circle using the laser provides a contact start/stop zone for the magnetic disk.

In a further embodiment, a single or a plurality of bumps provide a means for calibrating glide height of a transducer head flying over the magnetic disk.

In a further embodiment, a plurality of bumps provide a means for marking the magnetic disk.

In a further embodiment, a cylindrical lens system is used to form elliptical or elongated bumps on the surface of the finished glass substrate magnetic disk.

DETAILED DESCRIPTION OF PREFERRED EMBODIMENTS

The present invention applies a near IR wavelength laser zone texturing tool for use on a nonmetallic substrate, such as a glass or ceramic-glass, finished magnetic disk. While the preferred embodiment is described herein with reference to a glass substrate, it is understood by those skilled in the art, that the invention described herein may also be implemented using ceramic glass substrates and other nonmetallic substances known to be used in the manufacturing of magnetic disks for data storage. Therefore, throughout this description of the invention, the reference to "glass" is used to generally refer to glass and ceramic glass substrates, as well as other nonmetallic substrates.

The magnetic disk is conventionally produced by sputter depositing one or more underlayer(s), a magnetic layer and a protective carbon overcoat layer. After all the layers have been added a near IR wavelength laser beam such as a vanadate laser system is used to provide texturing. The process may also be applied to a magnetically sputtered glass substrate based disk after it has been lubed in accordance with the normal lube process for magnetic disks.

Figure 1:
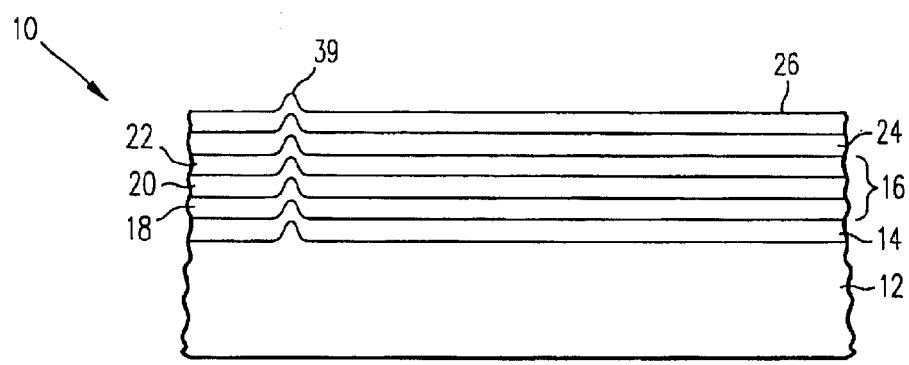
FIG. 1 illustrates a cross-section of a glass substrate based magnetic disk containing a bump.

Referencing FIG. 1, a cross section of a magnetic glass substrate disk 10 is shown. According to standard industry practices, a series of under layers of metal alloys are sputter applied, according to conventional techniques, prior to the application of the actual magnetic layer which holds the electronic data. These under layers are used to improve the magnetic performance quality of the recording substrate. The first under layer 14 is preferably nickel aluminum (NiAl) which is the first substance sputtered onto the glass substrate 12. This layer is sometimes referred to as a seed layer. The next under layer that is applied is the chromium vanadium (CrV) 18 which is followed by a layer of cobalt chromium (CoCr) 20. After these under layers have been applied, a magnetic layer of cobalt chromium platinum boron (CoCrPlBo) 22 is applied. After the magnetic layer is sputtered onto the disk, a carbon overcoat (coc) layer 24 is applied. The carbon overcoat material comprises a carbon which has been nitrogenated or hydrogenated in order to produce a protective, diamond-like substance. After the sputter processes are completed, the magnetic disk goes through a lubrication process to complete the production process of the magnetic disk by adding a layer of lubricant 26. In the preferred embodiment, a common lubricant that is used in the industry is the commercially available Z-dol 4000 lubricant. Other lubricants may also be used. A lubricated disk is referred to as a "finished disk".

In the preferred embodiment, the seed layer is a nickel aluminum alloy. However, other conventionally employed metal alloy underlayer substances known to be used in the production of magnetic disks may also be used in accordance with the present invention. Likewise, in the preferred embodiment the under layers and magnetic layer of the present invention comprises cobalt based alloys with the carbon overcoat protection. Other under layers, magnetic layers and hard protective overcoat layers may also be used.

The thicknesses of the under layer, magnetic layer, and carbon overcoat layer are consistent with conventional practices in the manufacturing of a magnetic disk media. In the preferred embodiment, the nickel aluminum is approximately 300 angstroms, the CrV is approximately 300 angstroms, the CoCr is approximately 40 angstroms and the CoCrPlBo is approximately 200 angstroms. The carbon overcoat layer is applied at a thickness of approximately 50 angstroms.

Figure 2:
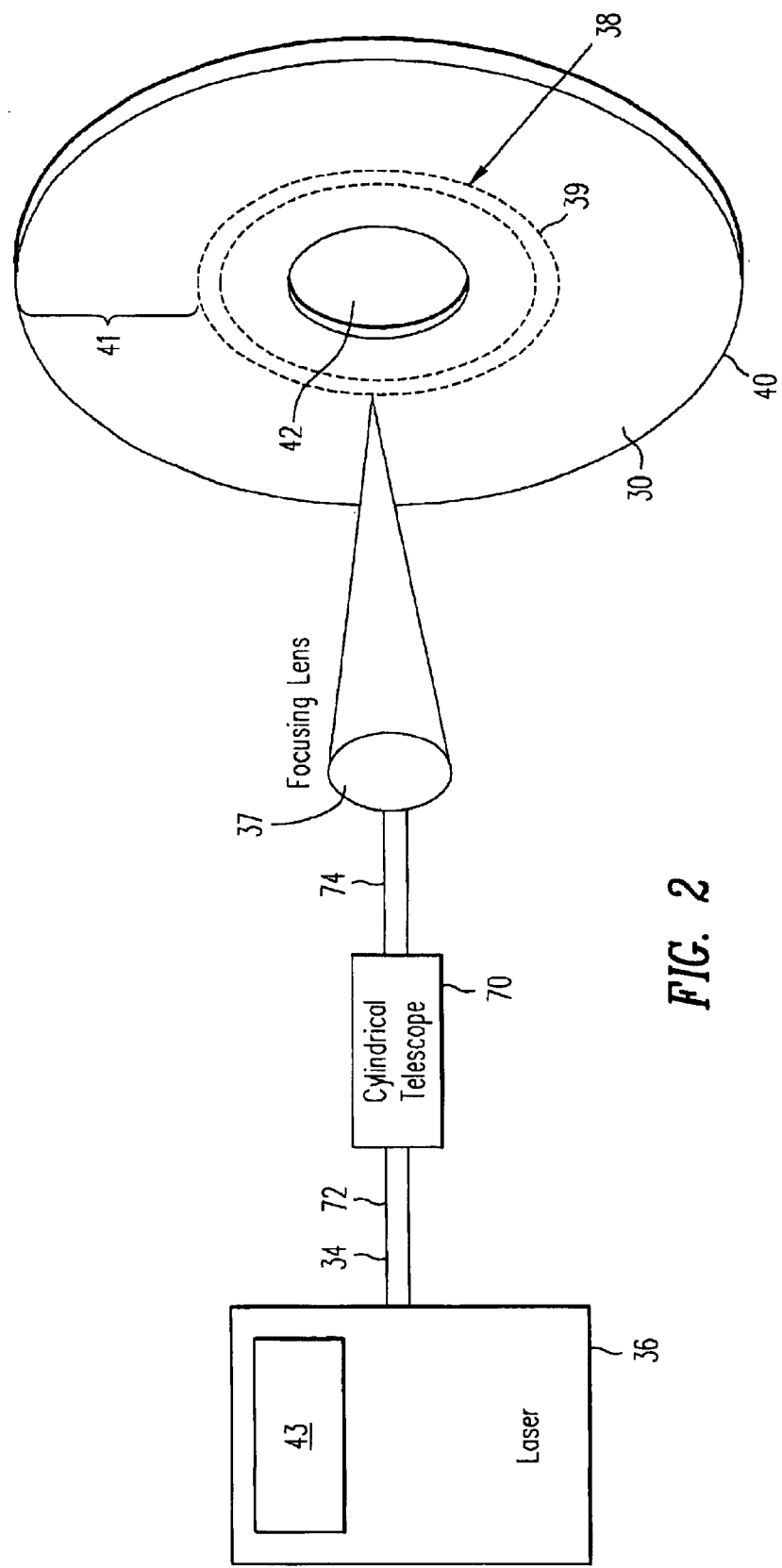
FIG. 2 illustrates a magnetic disk containing landing and data zones and showing a block diagram of a laser creating the bumps for the landing zone.

Referencing FIG. 2, in accordance with the present invention, the surface of the finished glass or glass/ceramic substrate based magnetic disk 30 is provided with a textured takeoff and landing (contact start/stop) zone by utilizing a pulse focused laser beam 34 provided by a near IR wavelength laser such as an Nd:Vanadate laser 36. The beam 34 is directed onto the locations of the disk surface 30 by passing the beam 34 through a focusing lens 37.

The resulting laser texture comprises a plurality of accurately positioned protrusions or bumps 39 with controlled height and geometry to optimize tribologic and magnetic requirements compatible with the requirements of a high density storage landing zone 38. The bumps 39 in the landing zone 38 are spaced according to the tribology performance requirements or can be spaced randomly. The disk 30 has an outer diameter 40 and an inner diameter 42. The width of the landing zone 38 is typically about 2–3 mm. The landing zone 38 is preferably spaced 3½–5 or 6 mm from the disk inner diameter. The remaining surface area of the disk is referred to as the data zone 41.

The preferred near IR wavelength laser used is an Nd:Vanadate (Nd:YVO4) laser system. In an Nd:Vanadate laser, a neodymium-doped yttrium-lithium-vanadate crystal 43 is used as the lasing medium to produce the laser stream. Other near IR wavelength lasers, such as Nd:YLF laser, may also be used. An example of a commercially available vanadate laser is the T-Series Laser System available from Spectra-Physics.

One of the critical optical parameters in a laser texturing process for achieving tight control on the bump height is the depth of focus of the laser spot on the disk surface. A laser texturing tool system with a longer depth of focus is less sensitive to disk-to-disk thickness variations and more forgiving of minor imperfections in the optical and mechanical alignment in the system. A longer depth of focus has the advantage of providing a tighter control on the average bump height during manufacturing production. In order to achieve the same bump diameter, the depth of focus for an Nd:Vanadate laser texturing system is a few times longer than the depth of focus for the $CO_2$ laser based system. This provides greater consistency in the textured zones between disks and provides a more economical way of producing the bumps.

The Nd:Vanadate laser pulse width used in texturing process, is typically a few times shorter than the $CO_2$ laser pulse width. Therefore the Nd:Vanadate laser has less thermal diffusion in the glass substrate and therefore has the ability to form smaller bumps. The Nd:Vanadate laser pulse energy is mostly absorbed by the sputtered film which is consistently opaque to the vanadate laser beam. This process also takes advantage of the better disk to disk compositional and structural consistency of the sputtered magnetic layers (film) on the glass/glass ceramic substrate.

The shape of the bumps formed on a sputtered or finished disk, for a fixed laser spot size and pulse duration, is mainly dependent on the pulse energy that is applied. The bumps created on a sputtered disk can be dome-shaped (similar to those formed by a $CO_2$ based laser on a raw glass substrate), or quasi-dome shape, or sombrero-shaped, or even have a V-shape crater in the center of the bump if the laser pulse energy is increased. The laser pulse energy can also cause cracking or breakage in the sputtered layer resulting in other mostly irregular bump shapes.

The bump height range of interest for a contact start/stop zone, the 10–30 nanometer range (or lower), does not require high laser pulse energy that can damage, or burn through, the sputtered layers.

Figure 3:
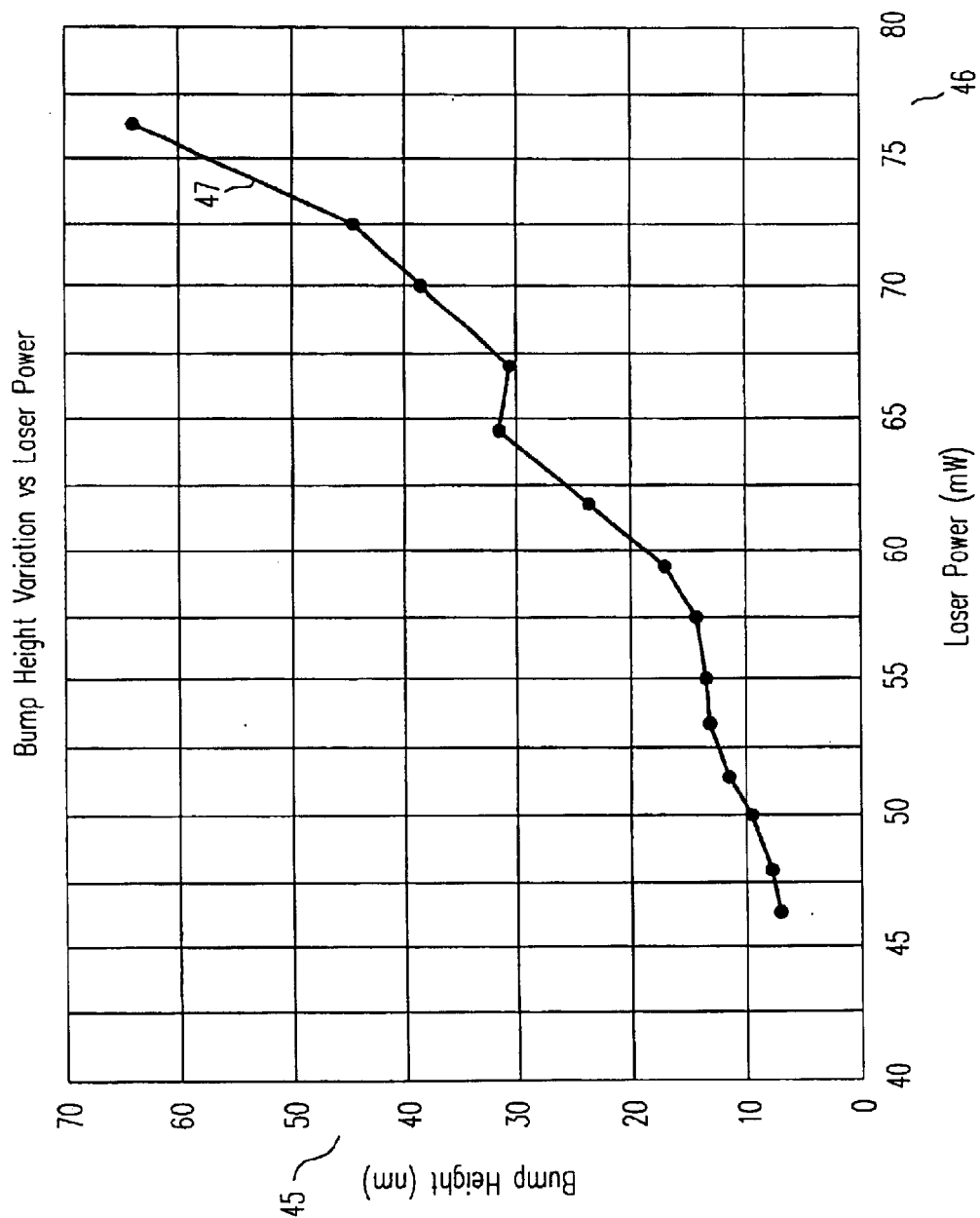
FIG. 3 is a graph showing the bump height variation versus the laser power on a finished glass disk.

FIG. 3 illustrates a graph of the bump height variation 45 relative to various laser powers 46 (the power curve 47). The bump height range of practical interest on a sample production disk is between 10 and 25 nanometers. The graph depicts the power curve for tested disks having the disclosed sputtered layer structure. The laser power used to produce the desired bump height is dependent on the laser beam spot diameter, pulse duration and pulse energy. As shown, the slope of the curve is not the same at different segments of the curve. This relates to the fact that the increase in laser power not only increases the bump height, it also induces changes in the bump slope and shape.

Figure 4A:
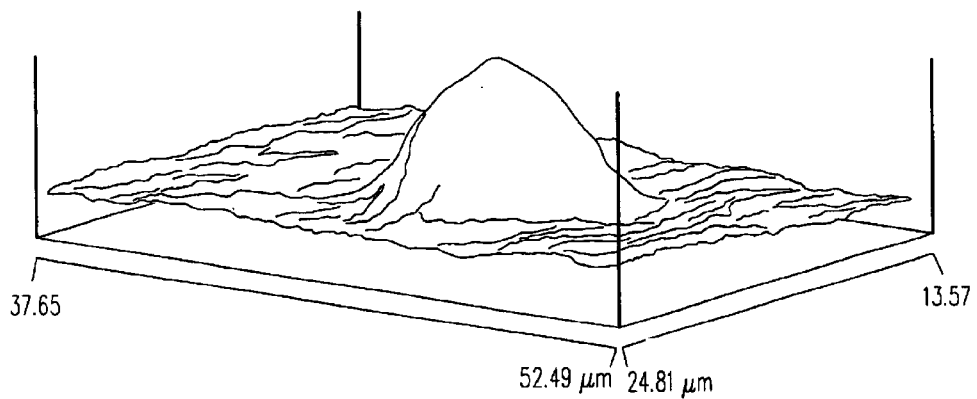
FIGS. 4a–d are illustrations of the bumps created by various powers of the Nd:Vanadate laser on the finished glass disk.
Figure 4B:
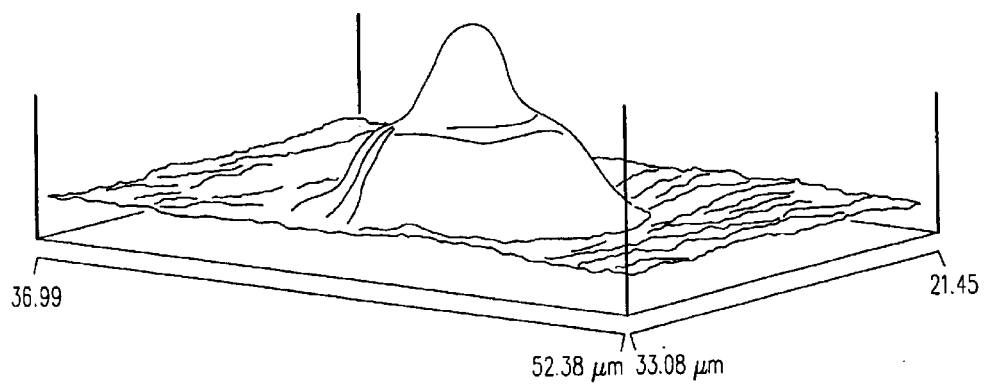
Figure 4C:
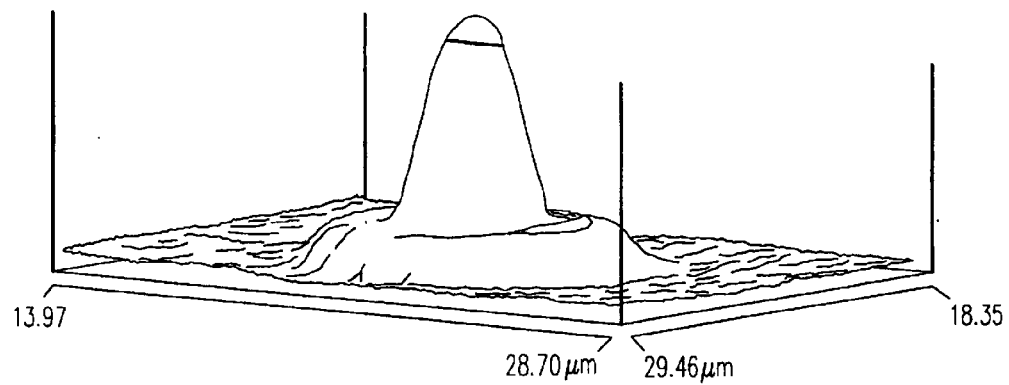
Figure 4D:
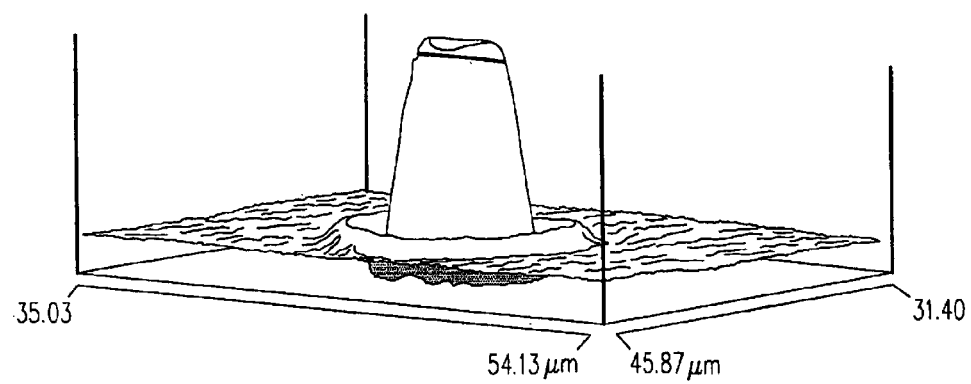

FIGS. 4a–4e illustrates the variations in the bumps produced by the various laser powers. FIG. 4a illustrates a dome-shaped bump produced by 49.9 micro watts of power. FIG. 4b shows a semi dome shaped bump produced by 57.5 micro watts of power. The bump diameter is slightly larger than the dome-shaped bump. FIG. 4c shows a sombrero-shaped bump produced by 67 micro watts of power and FIG. 4d illustrates a crater-shaped bump produced by 72.6 micro watts of power.

The foregoing process may also be implemented for disk marking. The disk marking process can be used to produce, but is not limited to, alphanumeric writing on the sputtered or finished disk. An example of the disk marking process is the markings used for distinguishing a good and a defective side of a single-sided finished disk.

Figure 5:
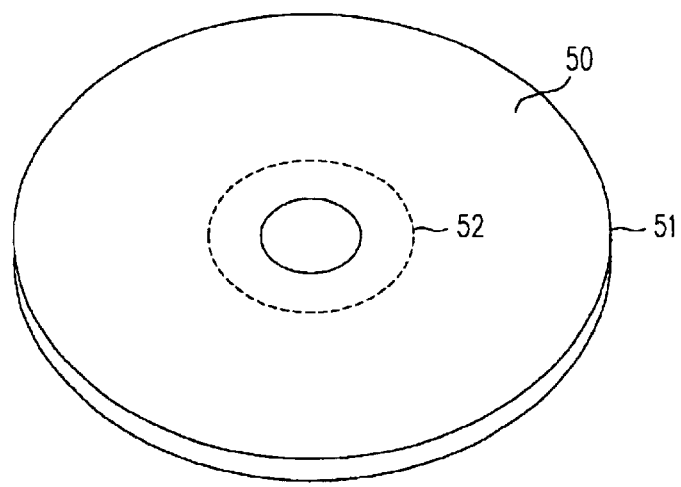
FIG. 5 is an illustration of a one sided glass disk marked with a ring.

Referencing FIG. 5, in order to identify the defective side 50 of a one sided finished glass or glass ceramic substrate based magnetic disk 51, a textured ring 52 or other arbitrary pattern is produced on the defective side of the finished glass disk. Such a marked, finished glass disk can be used in a load/unload drive and not necessarily in a contact start/stop drive. The ring-marking of a finished glass substrate disk by the application of available Nd:Vanadate laser, or other near-IR-wavelength lasers, texturing systems can be produced by the foregoing process.

Currently, one common practice is to mark a one sided disk with a pen. With the trend towards increasing volume of one-sided disks there is a need for a more consistent, lower cost, non-contaminant, and machine-readable marking system as is provided. The Nd:Vanadate-laser based texturing systems can be used to make patterns of rings, ridges and bumps near the inner diameter.

Additionally, bar-codes and even alphanumeric characters could be written on the finished glass substrate magnetic disk surface, with the use of galvonometer systems, for identifying the production site for the disk.

Figure 6:
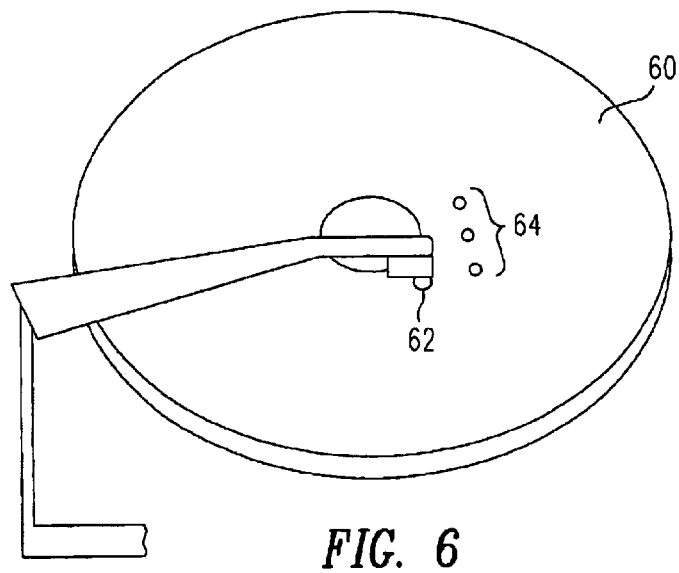
FIG. 6 illustrates a glide height test disk.

Referring to FIG. 6, in a further embodiment of the present invention, a reference disk 60 is produced to calibrate flight height of a transducer head 62 over a magnetic disk. The reference disk 60 contains a protrusion or a pattern of protrusions 64 which substantially simulate asperities typically formed on the surface of magnetic disk. Preferably, a plurality of radially spaced circumferential rows of protrusions are produced. The protrusions can be spaced apart either randomly or substantially uniformly in the radial direction and circumferential directions.

In a preferred embodiment of the invention, the laser light beam from a Nd:Vanadate laser is focused on a finished glass or glass/ceramic substrate based magnetic disk to obtain the array of protrusions. Preferably, the height of the protrusions is between 12 and 29 nanometers for use in calibrating the flight height. The process for calibrating transducer heads using such a reference is well known in the art.

Glide height calibration bumps made by a Nd:Vanadate laser texturing tool on a finished disk is superior to corresponding bumps made by a $CO_2$ laser on a glass substrate. The Nd:Vanadate laser provides a more consistent bump height and shape because the Vanadate laser provides total surface absorption rather than bulk absorption as provided by a $CO_2$ based laser. Furthermore, the Vanadate tool can be used for smaller bump diameter ranges with less focus sensitivity than a $CO_2$ laser based tool. Also, vanadate laser based tools are a preferable approach for producing glide height test disks since the existing vanadate laser based tools can be utilized.

Figure 7:
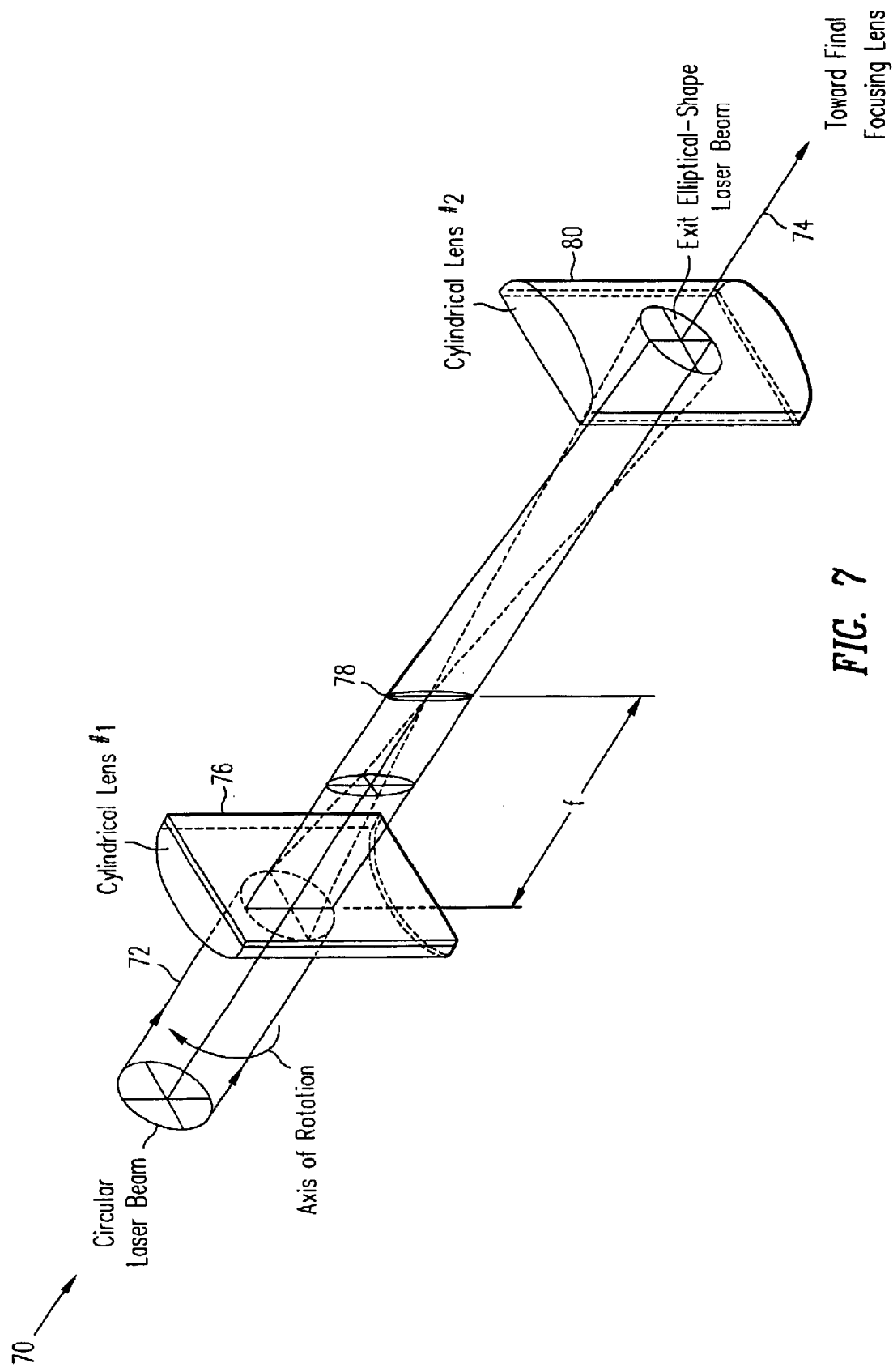
FIG. 7 illustrates a cylindrical lens system that converts a circular beam into elliptical shape.

In a further embodiment of the invention, an improved design for a laser texture tool is shown in FIG. 2 and FIG. 7. The illustrated cylindrical lens system 70 converts a circular beam 72 into an elliptically shaped laser beam 74 prior to subjecting the beam to a focusing lens 37 which directs the beam onto the desired location of the disk surface 30.

It is advantageous to be able to adjust the shape and orientation of the laser produced bumps in order to gain a tribological improvement in a CSS drive. It is also advantageous to adjust and optimize the contact area between the head and a bump (protrusion) in a glide height calibration test system. The greater the contact area, the greater the impulse impact (signal generation) between the head and bump during the testing procedure.

The cylindrical lens assembly 70 (a Keplerian cylindrical telescope) provides a system for adjusting the size and aspect ratio of the elliptical beam 74. The size and aspect ratio of the elliptical beam can be adjusted by altering the distance between the two cylindrical lenses 76 and 80. In the preferred embodiment a Keplerian cylindrical telescope is shown. However, it is understood by those skilled in the art that a Galilean cylindrical telescope would also provide the same capabilities for re-sizing and adjusting the laser beam. The cylindrical lens system as shown is simple to assemble and provides for easy adjustment of the size and aspect ratio of the elliptical beam.

The bump axes with respect to the disk radial direction can be easily adjusted. Preferably, a cylindrical rotator (not shown) is installed with scale markings (in degrees) to rotate the telescope and thus the axes of the elliptical laser beam. Using round shaped cylindrical lenses and simultaneously rotating both lens axes provides the same advantage as the cylindrical rotator. Thus the aspect ratio and bump axes direction can be adjusted for optimized contact start stop operation. Preferably this optical assembly can be employed in an existing laser texturing tool before the final focusing lens in order to adjust the shape of the laser beam entering the focusing lens, and therefore, the shape of the focused spot size on the disk.

The circular laser beam 72 enters the first cylindrical lens 76 which elongates the beam. At the focal point 78 for the first cylindrical lens, the beam is elongated. That is, focussed in one direction. The beam then passes a second cylindrical lens 80. The beam exits the second cylindrical lens as an elliptically shaped laser beam 74. The exit beam 74 is focused in a tight elliptical spot with an adjustable aspect ratio.

In general, the aspect ratio and the size of the exit beam is determined by the focusing power of the two lenses and by the spacing of the lenses. The direction of the elliptical axis can be adjusted by rotation of the lenses. In the preferred embodiment, the first and second cylindrical lenses have the dimensions required to accommodate a beam diameter of 1 to 6 millimeters.

Figure 8:
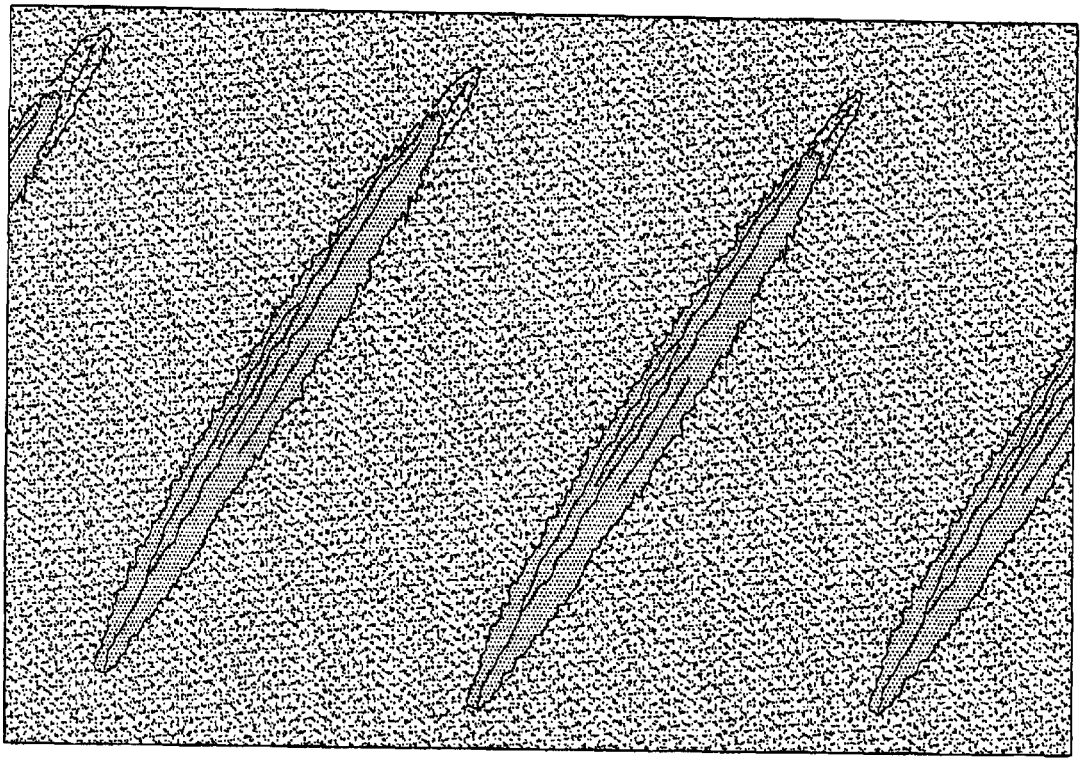
FIG. 8 illustrates elongated bumps on the surface of the finished glass disk.

FIG. 8 illustrates the resulting elongated bumps on the surface of the finished glass disk. The area shown is 163 micrometers by 123 micrometers.

Figure 9:
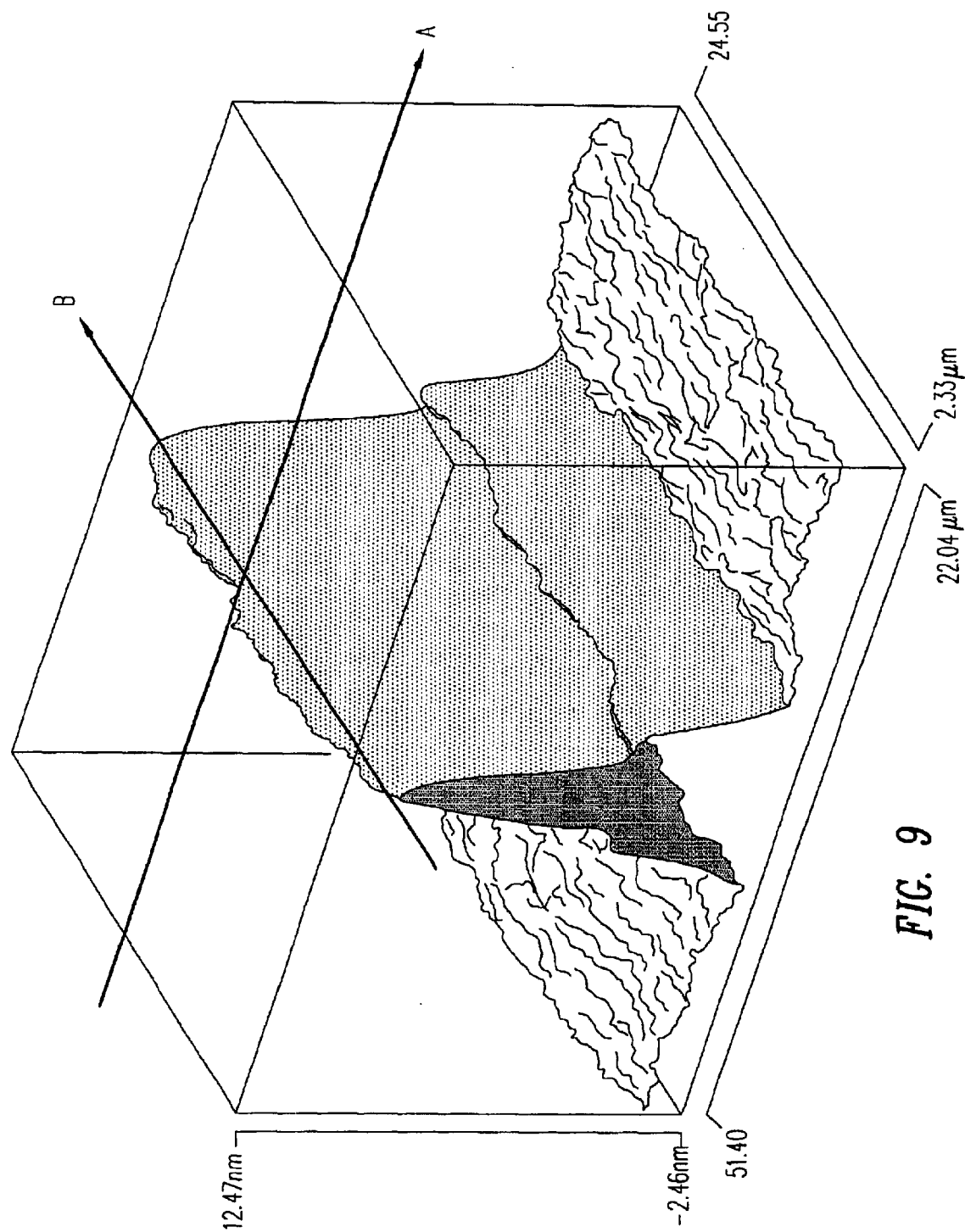
FIG. 9 illustrates a three dimensional view of the central portion of an elongated bump of FIG. 8.

FIG. 9 illustrates a three dimensional view of the central portion of an elongated bump of FIG. 8. The illustrated bump height is approximately 14 nanometers. The length of the mainly flat central portion of the bump is approximately 22 micrometers.

Figure 10:
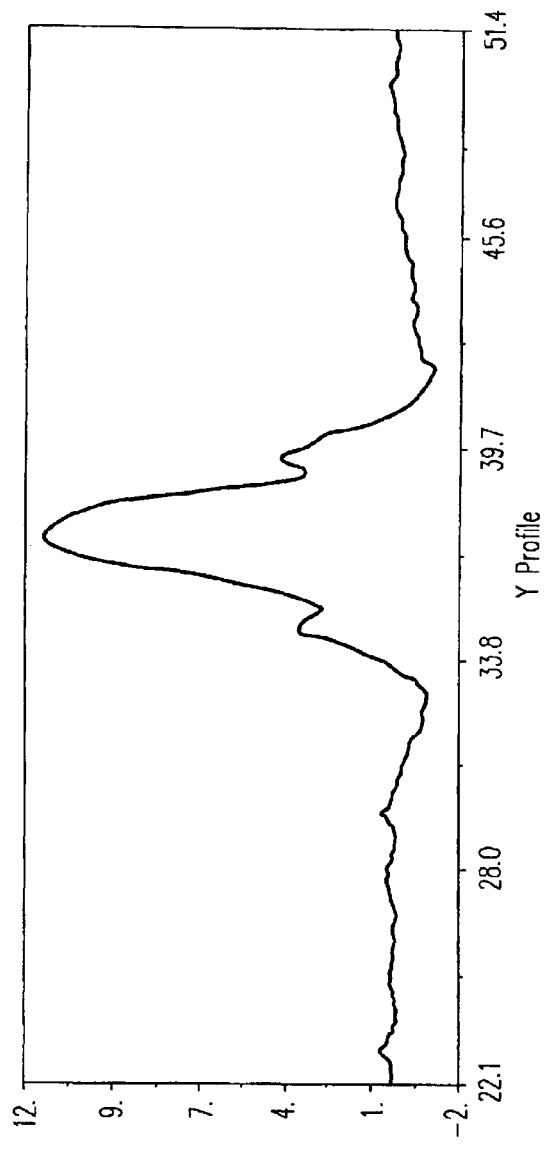
FIG. 10 illustrates the profile of the elongated bump along the short axis A of FIG. 9.
Figure 11:
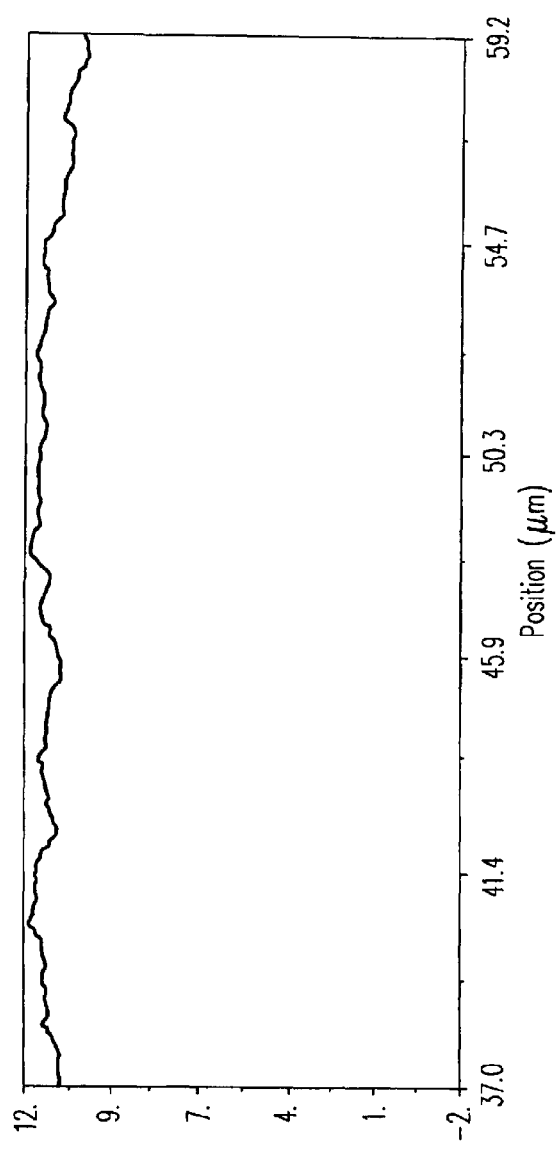
FIG. 11 illustrates the profile of the elongated bump along the central portion of the long axis B of FIG. 9.

FIG. 10 illustrates the profile of the elongated bump along the short axis A of FIG. 9. FIG. 11 illustrates the profile of the elongated bump along the central portion of the long axis B of FIG. 9. FIGS. 10 and 11 provide a cross sectional illustration of the bump shape as seen in axis A of FIG. 9. The bump profile along the short axis A could be dome shaped, semi-dome shaped, or sombrero shaped. The various shapes have advantageous applications for CSS disks and glide height calibration testing.

Figure 12:
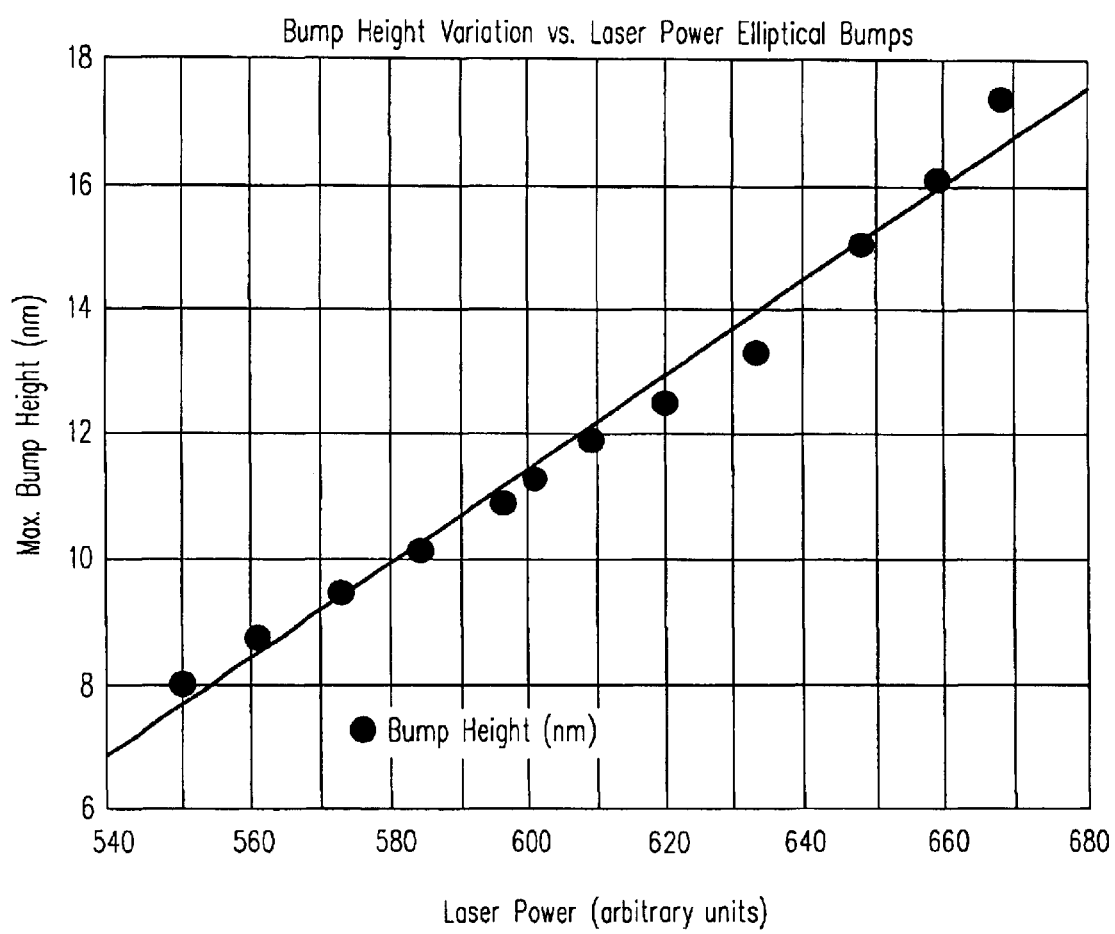
FIG. 12 illustrates a graph of bump height variation versus laser power for elongated bumps.

FIG. 12 illustrates a graph of bump height variation versus laser power for elongated bumps. The bump heights range from 8 nanometers to 18 nanometers using a range of laser power between 550 and 670 arbitrary units.

While elliptical shaped bumps may also be produced by using other optical components, this system and method is an efficient and versatile way of producing the elliptical bumps.

The invention has been described with particularity as to preferred embodiments. Those skilled in the art will know that variations are possible that do not depart from the spirit and scope of the invention. Accordingly the invention is limited only by the following claims.

We claim:

1. A method of manufacturing a magnetic disk comprising the steps of:
   a) sputtering at least one under layer of a metal alloy over a glass or glass ceramic substrate disk;
   b) sputtering as a magnetic layer over said under layer;
   c) sputtering a hard carbon coating over said magnetic layer; and
   d) applying a beam from a near IR wavelength laser to the surface of the carbon layer to form at least one bump.

2. The method of claim 1 wherein a plurality of bumps form an annular area for a contact start/stop zone.

3. The method of claim 1 wherein the at least one bump is used as part of a glide height calibration process.

4. The method of claim 1 wherein a plurality of bumps form an annular ring to mark a side of the disk for not being used.

5. The method of claim 1 wherein the at least one bump is part of a disk identifier.

6. The method of claim 1 wherein the at least one bump is an elongated bump formed by passing the laser beam through a cylindrical lens system and wherein the bump shape and aspect ratio of the elongated bump are adjusted by adjusting the cylindrical lens system.

7. The method of claim 1 wherein the near IR wavelength laser is an Nd:Vanadate laser.

* * * * *